United States Patent
Shimanaka et al.

(10) Patent No.: US 7,229,372 B2
(45) Date of Patent: Jun. 12, 2007

(54) SLIPPAGE PREVENTION APPARATUS OF BELT-DRIVE CONTINUOUSLY VARIABLE TRANSMISSION FOR AUTOMOTIVE VEHICLE

(75) Inventors: Shigeki Shimanaka, Kanagawa (JP); Hiroyasu Tanaka, Kanagawa (JP); Youhei Ishikawa, Kanagawa (JP); Tatsuo Wakahara, Kawasaki (JP); Yoshihisa Kodama, Yokohama (JP); Hideki Oshita, Yokohama (JP)

(73) Assignee: JATCO Ltd, Fuji-shi (JP)

( * ) Notice: Subject to any disclaimer, the term of this patent is extended or adjusted under 35 U.S.C. 154(b) by 612 days.

(21) Appl. No.: 10/670,775

(22) Filed: Sep. 26, 2003

(65) Prior Publication Data
US 2004/0127313 A1 Jul. 1, 2004

(30) Foreign Application Priority Data
Sep. 30, 2002 (JP) ............................. 2002-287027

(51) Int. Cl.
F16H 61/12 (2006.01)
F16H 61/18 (2006.01)
B60K 41/12 (2006.01)

(52) U.S. Cl. ............................. 474/28; 474/18; 477/45

(58) Field of Classification Search ................ 474/11, 474/18, 28; 477/45–50; 701/51, 54
See application file for complete search history.

(56) References Cited

U.S. PATENT DOCUMENTS

| | | | | |
|---|---|---|---|---|
| 5,168,778 A | * | 12/1992 | Todd et al. | 474/18 |
| 5,871,411 A | * | 2/1999 | Senger et al. | 475/45 |
| 6,217,469 B1 | | 4/2001 | Sawada et al. | |
| 6,219,608 B1 | | 4/2001 | Abo et al. | |
| 6,454,675 B2 | * | 9/2002 | Asayama et al. | 474/28 |
| 6,695,742 B2 | * | 2/2004 | Hagiwara et al. | 477/46 |
| 6,896,639 B2 | * | 5/2005 | Kang et al. | 477/44 |

(Continued)

FOREIGN PATENT DOCUMENTS

EP 0529777 A1 * 3/1993

(Continued)

OTHER PUBLICATIONS

U.S. Appl. No. 10/674,069, filed Sep. 30, 2003 Sawada et al.

(Continued)

Primary Examiner—Marcus Charles
(74) Attorney, Agent, or Firm—Foley & Lardner LLP (57) ABSTRACT

During a downshift of a belt-drive continuously variable transmission, occurring owing to vehicle deceleration, a CVT controller foretells that a slippage between a drive belt and each of primary and secondary variable-width pulleys tends to occur, when a primary pulley pressure is less than a first predetermined pressure level and a primary pulley speed is less than a first predetermined rotational speed. When the belt slippage has been foretold, the CVT controller inhibits the primary pulley pressure from dropping by setting an actual transmission ratio calculated before a set time period from a time when the slippage has been foretold or a transmission ratio of a relatively higher speed side as compared with a ratio-change operating state obtained when the slippage has been foretold, to a desired transmission ratio, or by relatively rising a line pressure as compared with a line pressure level produced when the slippage has been foretold.

28 Claims, 5 Drawing Sheets

U.S. PATENT DOCUMENTS

| | | |
|---|---|---|
| 2001/0049315 A1 | 12/2001 | Tsutsui |
| 2002/0004437 A1 | 1/2002 | Asayama et al. |
| 2002/0052264 A1 | 5/2002 | Ui |
| 2003/0045394 A1* | 3/2003 | Kurabayashi ................ 477/44 |
| 2004/0157700 A1 | 8/2004 | Katou |

FOREIGN PATENT DOCUMENTS

| | | | |
|---|---|---|---|
| JP | 10-54428 A | * | 2/1998 |
| JP | 11-37237 A | | 2/1999 |

OTHER PUBLICATIONS

U.S. Appl. No. 10/664,031, filed Sep. 17, 2003 Yamamoto et al.
U.S. Appl. No. 10/674,091, filed Sep. 30, 2003 Jozaki et al.
U.S. Appl. No. 10/670,270, filed Sep. 26, 2003 Nobu.
U.S. Appl. No. 10/670,271, filed Sep. 26, 2003 Nobu.
U.S. Appl. No. 10/662,442, filed Sep. 16, 2003 Ochiai et al.
U.S. Appl. No. 10/670,223, filed Sep. 26, 2003 Wakayama.
U.S. Appl. No. 10/673,549, filed Sep. 30, 2003 Sawada et al.

* cited by examiner

SLIPPAGE PREVENTION APPARATUS OF BELT-DRIVE CONTINUOUSLY VARIABLE TRANSMISSION FOR AUTOMOTIVE VEHICLE

TECHNICAL FIELD

The present invention relates to a belt slippage prevention apparatus of a belt-drive continuously variable transmission for an automotive vehicle, and specifically to the improvement of techniques for optimizing a so-called speed-change hydraulic pressure to prevent slippage between a variable-width pulley (in particular, a primary pulley) and a drive belt incorporated in a belt-drive continuously variable transmission (belt-drive CVT) during a downshift.

BACKGROUND ART

In recent years, there have been proposed and developed various belt-drive continuously variable transmissions (CVTs), which enable an actual transmission ratio to be steplessly adjusted or feedback-controlled toward a desired transmission ratio. As is generally known, a belt-drive continuously variable transmission uses a drive belt (usually, a single segmented steel belt) running in a pair of variable-width pulleys, that is, primary and secondary pulleys whose V grooves are aligned with each other, to provide varying gear ratios or pulley ratios or transmission ratios. In more detail, the V groove of the primary pulley, to which input rotation is transmitted from an engine, is constructed by a stationary flange and an adjustable flange axially slidable for varying the width of the V groove of the primary pulley by way of a "primary pulley pressure". The V groove of the secondary pulley, which is connected via a gear train to drive wheels, is constructed by a stationary flange and an adjustable flange for varying the width of the V groove of the secondary pulley by way of a "secondary pulley pressure". Each of the primary and secondary pulley pressures is produced by properly modulating a line pressure, which is used as an initial pressure. Actually, the adjustable flange of the primary pulley is forced toward the associated stationary flange by the primary pulley pressure, and simultaneously the adjustable flange of the secondary pulley is forced toward the associated stationary flange by the secondary pulley pressure. This enables power transmission between the primary and secondary pulleys via the drive belt (the segmented steel belt), while keeping the drive belt in friction-contact with the V grooves of the primary and secondary pulleys. One such belt-drive continuously variable transmission has been disclosed in Japanese Patent Provisional Publication No. 11-37237 (hereinafter is referred to as "JP11-37237"). During speed-change operation, a ratio-change control actuator, such as a step motor, is moved or actuated toward an operative position corresponding to the number of angular steps based on a desired transmission ratio (a desired pulley ratio), to change the primary pulley pressure. As a result, the differential pressure between the primary and secondary pulley pressures, corresponding to the desired transmission ratio, is produced to change the widths of the V grooves of the primary and secondary pulleys and thus to achieve the desired transmission ratio. As can be appreciated from the above, a downshift is achieved by increasing the width of the V groove of the primary pulley by way of a reduction in the primary pulley pressure and by decreasing the width of the V groove of the secondary pulley by way of a rise in the secondary pulley pressure. In case that a downshifting action, which is achieved by a drop in the primary pulley pressure, is comparatively quick, in particular, in case that a rapid downshift is executed under a condition that input rotation transferred into the CVT is relatively low, for example, just before the vehicle is stopped, there is an increased tendency for a temporary lack of the actual primary pulley pressure to occur. In such a case, undesired slippage (frictional losses or power losses) between the drive belt and the variable-width pulley tends to occur, thereby reducing the durability of the drive belt owing to drive-belt wear. This leads to the problem of a remarkably reduced durability of the CVT. One way to avoid this is to constantly set each of primary and secondary pulley pressures to a relatively high-pressure level through all speed-change operations containing a downshifting period. However, in order to keep the line pressure constantly at a high-pressure level, an increased margin (or a proper offset or a proper steady-state deviation) has to be given with respect to the line pressure, serving as an initial pressure of each of the primary and secondary pulley pressures. This means a wasteful increase in the load on an engine-driven oil pump that produces the line pressure, thus deteriorating fuel economy and increasing fuel consumption. For the reasons discussed above, it is desirable to keep the speed-change hydraulic pressure (in particular, the primary pulley pressure) to just below a critical pressure level where undesirable slippage between the variable-width pulley and the drive belt would start to develop. However, it is difficult to hold the speed-change hydraulic pressure to just below the critical pressure level for slippage prevention, because of various factors, that is, differences in quality of hydraulic parts used in a hydraulic modulator of the CVT, drive-belt wear, input-torque fluctuations, disturbance torque, a delay in response of the speed-change hydraulic pressure to a rapid change in input torque, and the like. Thus, it would be desirable to provide a means by which a state that undesirable slippage between a variable-width pulley and a drive belt may start to develop can be foretold or predicted or precognized, so as to prevent or suppress an undesirable drop in the primary pulley pressure from developing.

SUMMARY OF THE INVENTION

Accordingly, it is an object of the invention to provide a slippage prevention apparatus of a belt-drive continuously variable transmission for an automotive vehicle, which is capable of effectively preventing a slippage between a variable-width pulley and a drive belt by foretelling a state that the belt slippage tends to occur, and by timely suppressing an undesirable drop in a primary pulley pressure from developing in particular during a downshift, thus improving fuel economy, reducing drive-belt wear, and enhancing the durability of the CVT.

In order to accomplish the aforementioned and other objects of the present invention, a slippage prevention apparatus of a belt-drive continuously variable transmission for an automotive vehicle, which employs a primary variable-width pulley, a secondary variable-width pulley, and a drive belt running in the primary and secondary pulleys, and whose downshift is made by an increase in a V-groove width of the primary pulley arising from a drop in a primary pulley pressure supplied to the primary pulley and a decrease in the V-groove width of the secondary pulley occurring in synchronism with the drop in the primary pulley pressure, or by a decrease in a V-groove width of the secondary pulley arising from a rise in a secondary pulley pressure supplied to the secondary pulley and an increase in the V-groove width of the primary pulley occurring in synchronism with the rise in the secondary pulley pressure, comprises a belt slippage foretelling section that foretells that a slippage between the drive belt and each of the primary and secondary pulleys tends to occur when the primary pulley pressure is dropping, and a primary-pulley-pressure drop inhibition section that inhibits the primary pulley pressure from dropping, when the belt slippage foretelling section foretells that the slippage between the drive belt and each of the primary and secondary pulleys tends to occur.

According to another aspect of the invention, a method of preventing a slippage between each of a primary variable-width pulley and a secondary variable-width pulley and a drive belt running in the primary and secondary pulleys, all employed in a belt-drive continuously variable transmission for an automotive vehicle whose downshift is made by an increase in a V-groove width of the primary pulley arising from a drop in a primary pulley pressure supplied to the primary pulley and a decrease in the V-groove width of the secondary pulley occurring in synchronism with the drop in the primary pulley pressure, or by a decrease in a V-groove width of the secondary pulley arising from a rise in a secondary pulley pressure supplied to the secondary pulley and an increase in the V-groove width of the primary pulley occurring in synchronism with the rise in the secondary pulley pressure, the method comprises foretelling that the slippage between the drive belt and each of the primary and secondary pulleys tends to occur when the primary pulley pressure is dropping, and inhibiting the primary pulley pressure from dropping, when the slippage between the drive belt and each of the primary and secondary pulleys has been foretold.

The other objects and features of this invention will become understood from the following description with reference to the accompanying drawings.

DESCRIPTION OF THE PREFERRED EMBODIMENTS

Figure 1:
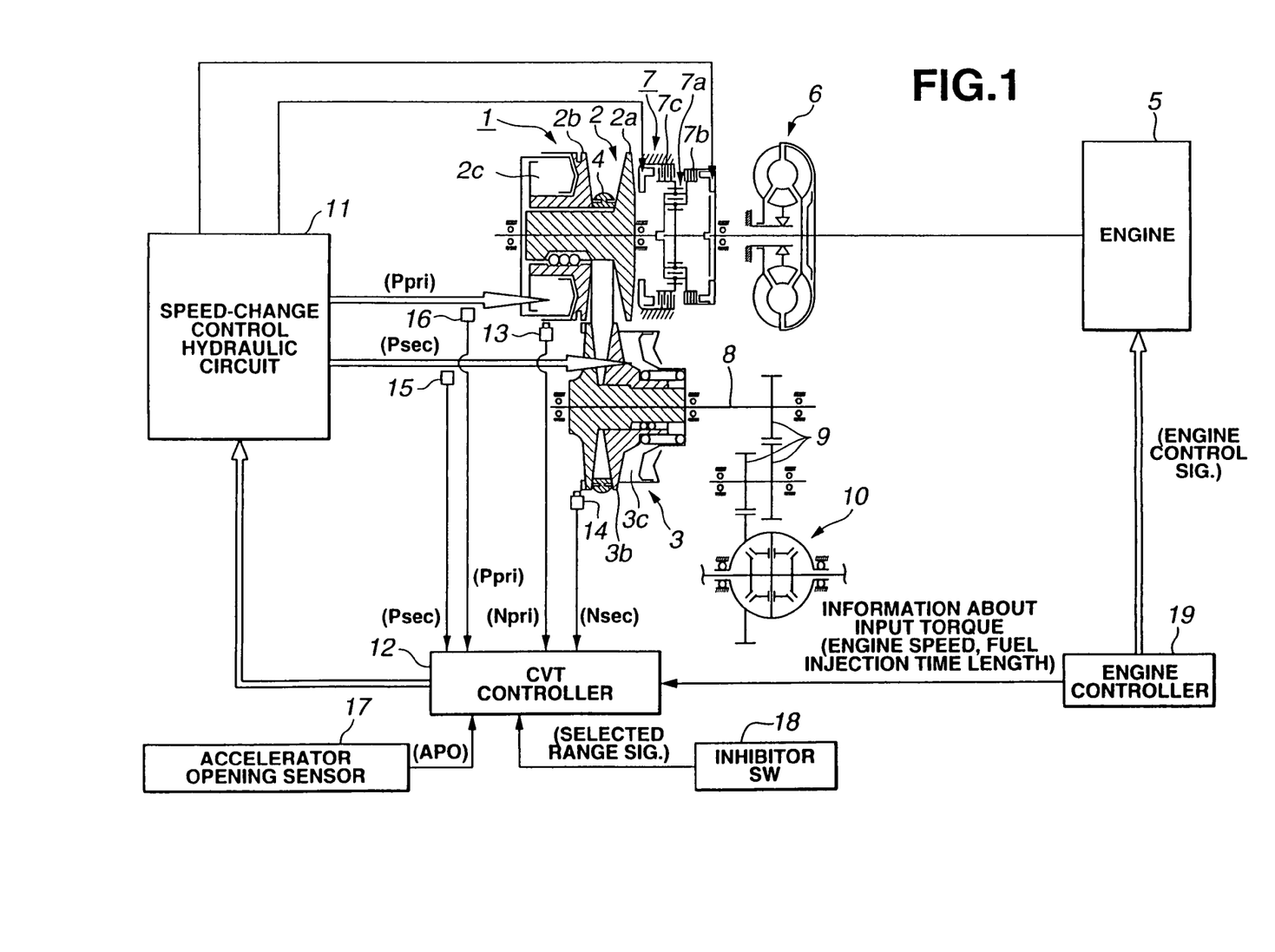
FIG. 1 is a system block diagram of an embodiment illustrating a power train and an automatic speed-change control system (an electronic CVT control system) of an automotive vehicle employing a slippage prevention apparatus of a belt-drive CVT.

Referring now to the drawings, particularly to FIG. 1, there is shown part of a power train of an automotive vehicle with a belt-drive continuously variable transmission (belt-drive CVT) 1, and structural details of an electronic CVT control system, necessary for automatic speed-change control. As can be appreciated from the cross section of FIG. 1, belt-drive CVT 1 uses an endless drive belt 4, such as an endless segmented steel belt, running in a pair of variable-width pulleys 2 and 3, namely primary and secondary—driving and driven—pulleys whose effective diameters are continuously variable to provide varying pulley ratios or transmission ratios. As seen in FIG. 1, V grooves of primary and secondary pulleys 2 and 3 are aligned with each other, and drive belt 4 is wound on the V grooves of primary and secondary pulleys. Drive belt 4, the V groove of primary pulley 2 (the input side of CVT 1), and the V groove of secondary pulley 3 (the output side of CVT 1) construct a so-called wrapping connector. An engine crankshaft of an engine 5 is coaxially aligned with the axis of primary pulley 2. A lockup torque converter 6 and a forward-and-reverse switching mechanism (simply, F/R switching mechanism) 7 are provided between engine 5 and primary pulley 2, in that order, to transmit input rotation from engine 5 through lockup torque converter 6 and F/R switching mechanism 7 to primary pulley 2. F/R switching mechanism 7 is mainly constructed by a double-pinion planetary gearset 7a. A sun gear of planetary gearset 7a is connected through torque converter 6 to engine 5, whereas a planet-pinion carrier of planetary gearset 7a is connected to primary pulley 2. F/R switching mechanism 7 also includes a forward clutch 7b through which the sun gear and the carrier of planetary gearset 7a are directly coupled with each other or uncoupled from each other, and a reverse brake 7c that serves to stop or permit rotation of the ring gear (the internal gear) of planetary gearset 7a. With forward clutch 7b engaged, torque (or input rotation) is transmitted from engine 5 via torque converter 6 and F/R switching mechanism 7 to primary pulley 2 without changing the rotation direction. On the contrary, with reverse brake 7c applied, input rotation (torque), which is transmitted from engine 5 into torque converter 6, is transmitted to primary pulley 2, with the reduced rotational speed and different sense. Torque (input rotation) transmitted into primary pulley 2 is transmitted via drive belt 4 to secondary pulley 3. Thereafter, torque, which is transmitted from primary pulley 2 via drive belt 4 to secondary pulley 3, is transmitted via a CVT output shaft 8 and a gear set 9 to a differential gear 10, and then transmitted via axle driveshafts to left and right drive wheels (not shown).

In order to change a ratio of the rotational speed of primary pulley 2 to the rotational speed of secondary pulley 3, that is, a transmission ratio or a pulley ratio of belt-drive CVT 1 during power transmission, the V grooves of primary and secondary pulleys 2 and 3 are constructed as follows.

The V groove of primary pulley 2 is constructed by a stationary flange (or a stationary sheave) 2a and an adjustable flange (or a movable sheave) 2b axially slidable on linear ball bearing splines (not numbered) for varying the width of the V groove of primary pulley 2 byway of hydraulic pressure Ppri, often called a "primary pulley pressure" or a "speed-change control pressure". In a similar manner, the V groove of secondary pulley 3 is constructed by a stationary flange 3a and an adjustable flange 3b axially slidable on linear ball splines (not numbered) for varying the width of the V groove of secondary pulley 3 usually by way of spring bias plus hydraulic pressure Psec, often called a "secondary pulley pressure" or a "regulated line pressure". In order to steplessly vary the pulley ratio of belt-drive CVT 1, the adjustable or movable flanges of primary and secondary pulleys 2 and 3 are designed to slide axially on the linear ball bearing splines, relative to the fixed flanges and to prevent relative rotation of the adjustable flanges to the respective fixed flanges. In more detail, primary and secondary pulley pressures Ppri and Psec are modulated from a line pressure serving as an initial pressure, and produced by means of a hydraulic modulator or a speed-change control hydraulic circuit 11 included in the electronic CVT control system. That is, the level of primary pulley pressure Ppri supplied to a primary pulley actuation cylinder or a primary pulley actuation chamber 2c and the level of secondary pulley pressure Psec supplied to a secondary pulley actuation cylinder or a secondary pulley actuation chamber 3c are both controlled by speed-change control hydraulic circuit 11. Actually, the adjustable flange 2b of primary pulley 2 is forced toward the associated stationary flange 2a by supplying primary pulley pressure Ppri to primary pulley actuation chamber 2c and simultaneously the adjustable flange 3b of secondary pulley 3 is forced toward the associated stationary flange 3a by supplying secondary pulley pressure Psec to secondary pulley actuation chamber 3c, to enable power transmission between primary and secondary pulleys 2 and 3 via drive belt 4, while keeping the drive belt in friction-contact with the V grooves of primary and secondary pulleys 2 and 3. In the shown embodiment, the pressure receiving area of primary pulley actuation chamber 2c is designed to be equal to that of secondary pulley actuation chamber 3c, to prevent the size (the outside diameter) of one of primary and secondary pulleys 2 and 3 from being large-sized in comparison with the other. This enables downsizing and lightening of the CVT. During ratio changing operation, in order to achieve a desired transmission ratio (or a desired pulley ratio), the widths of V grooves of primary and secondary pulleys 2 and 3 are changed by way of the differential pressure between primary and secondary pulley pressures Ppri and Psec. The differential pressure corresponds to the desired transmission ratio. Owing to the differential pressure, the diameter of the circular arc of drive belt 4 wound on the V groove of primary pulley 2 and the diameter of the circular arc of drive belt 4 wound on the V groove of secondary pulley 3 continuously change. In this manner, it is possible to steplessly vary the pulley ratio (the transmission ratio) between primary and secondary pulleys 2 and 3 within limits, so that the pulley ratio is brought closer to the desired pulley ratio. In the same manner as the output of hydraulic pressure needed for engagement of forward clutch 7b to be engaged when a forward running range such as a D range is selected or the output of hydraulic pressure needed for engagement of reverse brake 7c to be applied when a reverse running range such as an R range is selected, speed-change control hydraulic circuit 11 adjusts or regulates primary pulley pressure Ppri and secondary pulley pressure Psec. The speed-change control hydraulic circuit itself is controlled in response to a command signal from a CVT controller 12.

CVT controller 12 generally comprises a microcomputer. CVT controller 12 includes an input/output interface (I/O), memories (RAM, ROM), and a microprocessor or a central processing unit (CPU). The input/output interface (I/O) of CVT controller 12 receives input information from various engine/vehicle switches and sensors, namely a primary pulley speed sensor 13, a secondary pulley speed sensor 14, a secondary pulley pressure sensor 15, a primary pulley pressure sensor 16, an accelerator opening sensor (or an accelerator position sensor) 17, and an inhibitor switch 18, and also receives input information about input torque of the CVT (e.g., engine speed and fuel injection time length corresponding to the fuel injection amount), transmitted from an engine controller 19, which serves to electronically control engine 5. Primary pulley speed sensor 13 is provided to detect a primary pulley speed Npri, while secondary pulley speed sensor 14 is provided to detect a secondary pulley speed Nsec. Secondary pulley pressure sensor 15 is provided to detect secondary pulley pressure Psec, while primary pulley pressure sensor 16 is provided to detect primary pulley pressure Ppri. Accelerator opening sensor (accelerator position sensor) 17 is provided to detect an accelerator opening APO corresponding to an amount of depression of the accelerator. A signal from inhibitor switch 18 indicates a selected range, such as an R range or a D range. Within CVT controller 12, the central processing unit (CPU) allows the access by the I/O interface of input informational data signals from the engine/vehicle switches and sensors. The CPU of CVT controller 12 is responsible for carrying the CVT control program stored in memories and is capable of performing necessary arithmetic and logic operations containing automatic shift control achieved through speed-change hydraulic circuit 11. Computational results (arithmetic calculation results), that is, calculated output signals are relayed through the output interface circuitry of CVT controller 12 to output stages, namely a ratio-change control actuator, for example, a step motor 27 (described later), an electromagnetic solenoid 24a of a pressure-reducing valve 24 (described later), and an electromagnetic solenoid 23a of a pressure regulator valve 23 (described later) included in the automatic speed-change control system.

Figure 2:
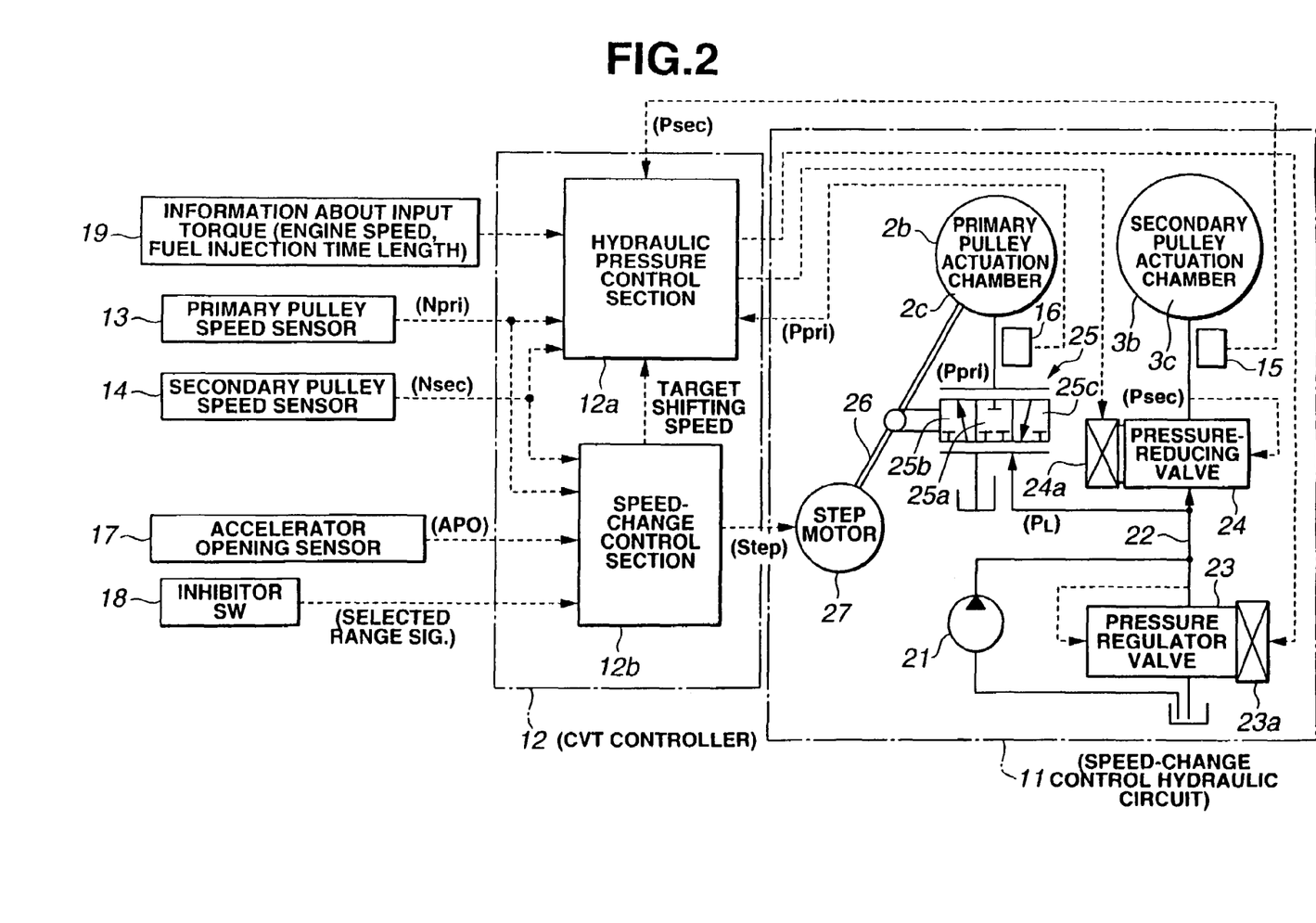
FIG. 2 is a block diagram showing the detailed structure of the speed-change control system of the embodiment shown in FIG. 1, in particular, the detailed structure of a speed-change hydraulic circuit and the detailed structure of an electronic CVT controller that performs a speed-change hydraulic pressure control.

The detailed structures of speed-change hydraulic circuit 11 and CVT controller 12 are hereunder described in detail in reference to the block diagram shown in FIG. 2.

Speed-change control hydraulic circuit 11 includes an engine-driven oil pump 21. A predetermined line pressure PL is produced by modulating or regulating working fluid (hydraulic oil) discharged from pump 21 into an oil passage 22, by means of pressure regulator valve 23. Line pressure PL in oil passage 22 is modulated by means of pressure-reducing valve 24, and then the modulated hydraulic pressure is supplied to secondary pulley actuation chamber 3c as a secondary pulley pressure Psec. In addition to the above, line pressure PL in oil passage 22 is modulated by means of a speed-change control valve 25, and then the modulated hydraulic pressure is supplied to primary pulley actuation chamber 2c as a primary pulley pressure Ppri. Pressure regulator valve 23 is comprised of a duty-cycle controlled solenoid valve having electromagnetic solenoid 23a, and the opening of pressure regulator valve 23 is controlled in response to a duty cycle value (or a duty ratio) of a duty-cycle modulated pulsewidth signal from a hydraulic pressure control section 12a, to adjust the pressure level of line pressure PL. Similarly, pressure-reducing valve 24 is comprised of a duty-cycle controlled solenoid valve having electromagnetic solenoid 24a, and the opening of pressure-reducing valve 24 is controlled in response to a duty cycle value of a duty-cycle modulated pulsewidth signal from hydraulic pressure control section 12a, to adjust the pressure level of secondary pulley pressure Psec.

On the other hand, speed-change control valve 25 is comprised of a three-position directional control valve having three different valve positions, a neutral position 25a, a pressure build-up position 25b, and a pressure reduction position 25c. As clearly shown in FIG. 2, for switching among the three valve positions, one end of the valve spool of speed-change control valve 25 is mechanically linked to the central portion of an I-shaped speed-change link 26. One end (a first end) of speed-change link 26 is connected to the motor shaft of step motor 27, whereas the other end (a second end) of speed-change link 26 is pivotally connected to the adjustable flange 2b of primary pulley 2. When step motor 27 is rotated in one operable direction from a reference position (an initial position) by the number of angular steps corresponding to a desired transmission ratio, speed-change link 26 rotates or pivots in one rotational direction or in the counter-clockwise direction (viewing FIG. 2) about the connecting portion between link 26 and primary-pulley adjustable flange 2b. As a result of this, speed-change control valve 25 shifts from neutral position 25a to pressure build-up position 25b. Conversely when step motor 27 is rotated in the opposite operable direction from the reference position (the initial position) by the number of angular steps corresponding to a desired transmission ratio, speed-change link 26 rotates or pivots in the other rotational direction or in the clockwise direction (viewing FIG. 2) about the connecting portion between link 26 and primary-pulley adjustable flange 2b. As a result, speed-change control valve 25 shifts from neutral position 25a to pressure reduction position 25c. With speed-change control valve 25 held at pressure build-up position 25b, fluid communication between oil passage 22 (or the line pressure line for line pressure PL serving as an initial hydraulic pressure) and primary pulley actuation chamber 2c is established, and thus primary pulley pressure Ppri supplied into primary pulley actuation chamber 2c is built up. On the contrary, with speed-change control valve 25 held at pressure reduction position 25c, fluid communication between oil passage 22 (or the line pressure line for line pressure PL) and primary pulley actuation chamber 2c is blocked and fluid communication between primary pulley actuation chamber 2c and a drain port connected to an oil tank (or an oil reservoir) is established, and thus primary pulley pressure Ppri in primary pulley actuation chamber 2c is reduced. In this manner, by properly changing the differential pressure between primary and secondary pulley pressures Ppri and Psec,an upshift to a high-speed side or a downshift to a low-speed side is achieved depending on the desired transmission ratio. Concretely, an upshift is made by a rise in primary pulley pressure Ppri supplied to primary pulley 2 (in other words, a decrease in the V-groove width of primary pulley 2), or a drop in secondary pulley pressure Psec supplied to secondary pulley 3 (in other words, an increase in the V-groove width of secondary pulley 3), and consequently by an increase in the secondary-pulley V-groove width, occurring in synchronism with the rise in primary pulley pressure Ppri, or a decrease in the primary-pulley V-groove width, occurring in synchronism with the drop in secondary pulley pressure Psec.On the contrary, a downshift is made by a drop in primary pulley pressure Ppri supplied to primary pulley 2 (in other words, an increase in the V-groove width of primary pulley 2), or a rise in secondary pulley pressure Psec supplied to secondary pulley 3 (in other words, a decrease in the V-groove width of secondary pulley 3), and consequently by a decrease in the V-groove width of secondary pulley 3, occurring in synchronism with the drop in primary pulley pressure Ppri, or an increase in the V-groove width of primary pulley 2, occurring in synchronism with the rise in secondary pulley pressure Psec.

A degree of progress for transmission-ratio changing is mechanically fed back to the second end of speed-change link 26 via adjustable flange 2c of primary pulley 2, and thus speed-change link 26 gradually pivots so that speed-change control valve 25 returns from its pressure build-up position 25b or pressure reduction position 25c to the initial position (neutral position 25a) as the transmission-ratio changing progresses. By way of the mechanical feedback operation, when a desired pulley ratio (a desired transmission ratio) has been reached, speed-change control valve 25 returns to its neutral position 25a, so as to terminate the ratio changing operation, and thus to maintain the desired transmission ratio corresponding to the ratio command signal value.

The previously-noted CVT controller 12 determines a duty cycle value of a duty-cycle modulated pulsewidth signal to be output from hydraulic pressure control section 12a to solenoid 23a of pressure regulator valve 23, a duty cycle value of a duty-cycle modulated pulsewidth signal to be output from hydraulic pressure control section 12a to solenoid 24a of pressure-reducing valve 24, a ratio command signal value (the number of angular steps of the step motor) to be output from a speed-change control section 12b (see FIG. 2) to step motor 27. CVT controller 12 also determines, depending on the selected range (the signal from inhibitor switch 18), whether the hydraulic pressure needed for engagement of forward clutch 7b should be output or the hydraulic pressure needed for application of reverse brake 7c should be output. As clearly shown in FIG. 2, CVT controller 12 is comprised of hydraulic pressure control section 12a and speed-change control section 12b. As hereunder described in detail, hydraulic pressure control section 12a of CVT controller 12 determines the duty cycle value of the duty-cycle modulated pulsewidth signal to be output to solenoid 23a of pressure regulator valve 23 and the duty cycle value of the duty-cycle modulated pulsewidth signal to be output to solenoid 24a of pressure-reducing valve 24. On the other hand, speed-change control section 12b of CVT controller 12 determines the number of angular steps of step motor 27, based on a belt slippage prevention speed-change control as well as a normal speed-change control, as described later. The belt slippage prevention speed-change control is an essential feature of the present invention.

Figure 3:
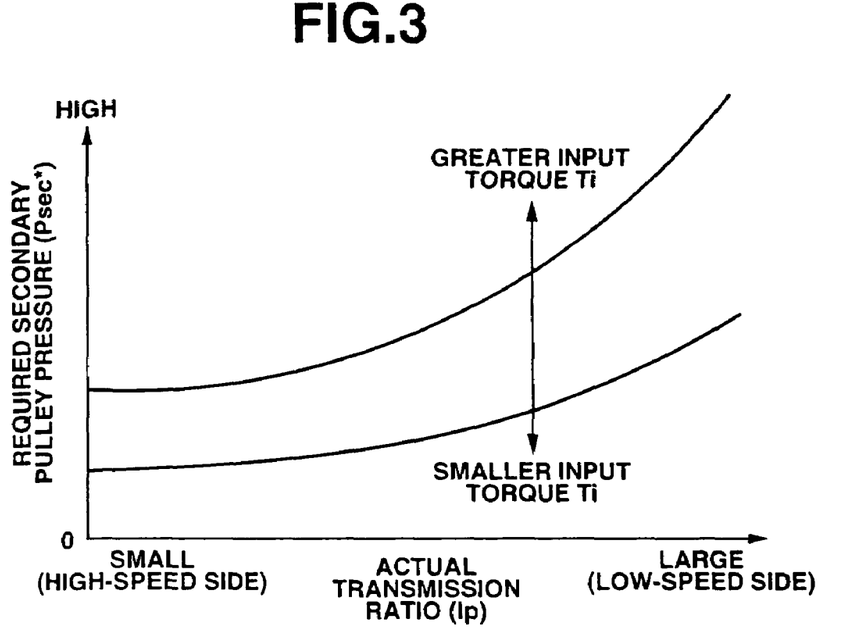
FIG. 3 is an actual transmission ratio Ip versus required secondary pulley pressure Psec* characteristic diagram.

Within hydraulic pressure control section 12a, first of all, a transmission input torque Ti is arithmetically calculated based on both an actual transmission ratio Ip and input information about input torque of the CVT (e.g., engine speed and fuel injection time length), transmitted from engine controller 19. The aforesaid actual transmission ratio Ip is calculated as the quotient (Npri/Nsec) corresponding to the division of primary pulley speed Npri by secondary pulley speed Nsec. Second, a required secondary pulley pressure Psec* is calculated or retrieved based on the actual transmission ratio Ip and transmission input torque Ti from the predetermined or preprogrammed actual transmission ratio Ip versus required secondary pulley pressure Psec* characteristic map shown in FIG. 3. Third, a deviation (Psec−Psec*) of the actual secondary pulley pressure Psec, detected by secondary pulley pressure sensor 15, and required secondary pulley pressure Psec* retrieved is calculated. On the basis of the deviation (Psec−Psec*), hydraulic pressure control section 12a computes and determines the duty cycle value of the duty-cycle modulated pulsewidth signal to be output to solenoid 24a of pressure-reducing valve 24, so that the actual secondary pulley pressure Psec is brought closer to required secondary pulley pressure Psec* by way of feedback control based on the deviation (Psec−Psec*). The duty-cycle modulated pulsewidth signal having the duty cycle value determined is generated from the output interface circuitry of hydraulic pressure control section 12a to solenoid 24a of pressure-reducing valve 24.

Figure 4:
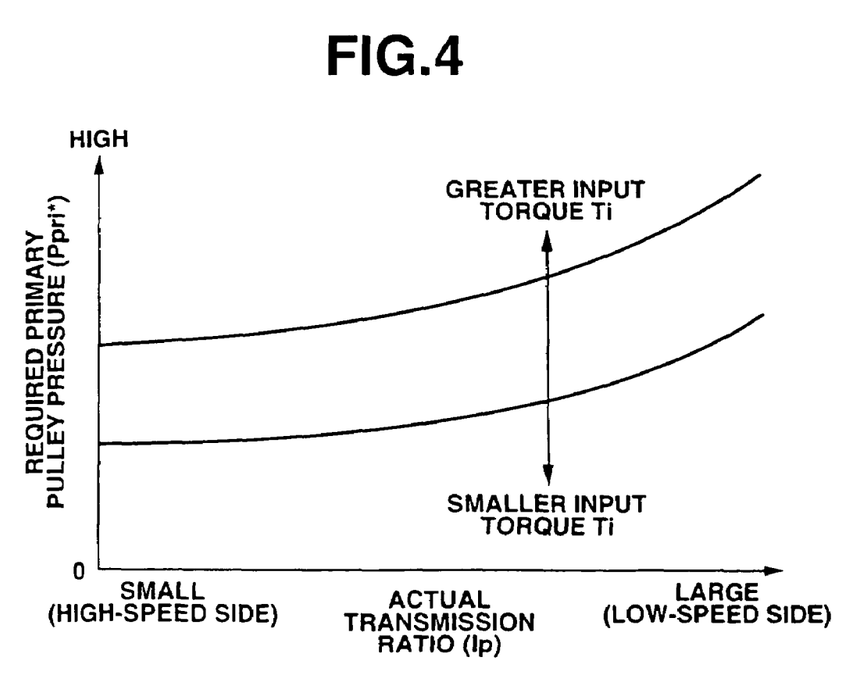
FIG. 4 is an actual transmission ratio Ip versus required primary pulley pressure Ppri* characteristic diagram.

Hydraulic pressure control section 12a of CVT controller 12 also calculates or retrieves a required primary pulley pressure Ppri based on the actual transmission ratio Ip and transmission input torque Ti from the predetermined or preprogrammed actual transmission ratio Ip versus required primary pulley pressure Ppri* characteristic map shown in FIG. 4. After this, hydraulic pressure control section 12a compares required primary pulley pressure Ppri* to required secondary pulley pressure Psec*, and then selects a higher one of required pulley pressures Ppri* and Psec* by way of a so-called select-HIGH process MAX(Ppri*, Psec*). When required primary pulley pressure Ppri* is higher than or equal to required secondary pulley pressure Psec*, that is, in case of Ppri*≧Psec*, hydraulic pressure control section 12a selects required primary pulley pressure Ppri* as the higher one, and thus sets a desired line pressure PL* to the same pressure level as the selected pulley pressure Ppri*, that is, PL*=MAX(Ppri*, Psec*)=Ppri*, and then outputs the duty-cycle modulated pulsewidth signal having the duty cycle value, corresponding to the desired line pressure PL* set at the same pressure level as the selected pulley pressure MAX(Ppri*, Psec*)=Ppri*, to solenoid 23a of pressure regulator valve 23. Conversely when required primary pulley pressure Ppri* is lower than required secondary pulley pressure Psec*, that is, in case of Ppri*<Psec*, hydraulic pressure control section 12a selects required secondary pulley pressure Psec* as the higher one, and thus sets a desired line pressure PL* to the same pressure level as the selected pulley pressure Psec*, that is, PL*=MAX(Ppri*, Psec*)=Psec*, and then outputs the duty-cycle modulated pulsewidth signal having the duty cycle value, corresponding to the desired line pressure PL* set at the same pressure level as the selected pulley pressure MAX(Ppri*, Psec*)= Psec*, to solenoid 23a of pressure regulator valve 23.

Figure 5:
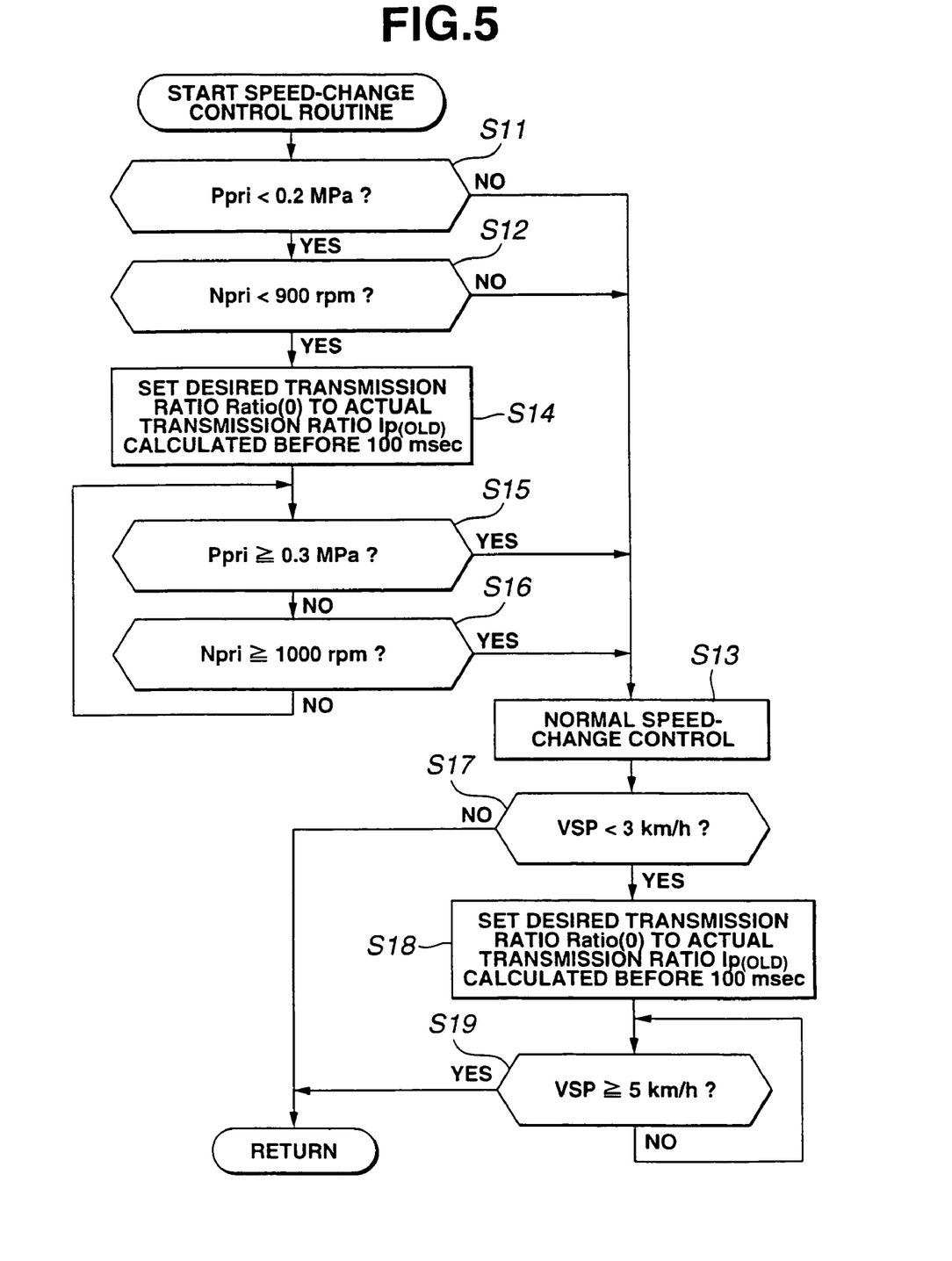
FIG. 5 is a flow chart illustrating a control program executed by a speed-change control section of the CVT controller shown in FIG. 2.

The operation of speed-change control section 12b of CVT controller 12 is hereinafter described in reference to the control program shown in FIG. 5. According to the control program of FIG. 5, switching between the normal speed-change control and the belt slippage prevention speed-change control corresponding to the essential aim or essential feature of the present invention is performed as discussed hereunder. The control routine shown in FIG. 5 is executed as time-triggered interrupt routines to be triggered every predetermined sampling time intervals.

At step S11, a check is made to determine whether primary pulley pressure Ppri, detected by primary pulley pressure sensor 16, is less than a set pressure level (a first predetermined pressure level) such as 0.2 MPa. When the answer to step S11 is in the affirmative (YES), that is, Ppri<0.2 MPa, the routine proceeds from step S11 to step S12. Conversely when the answer to step S11 is in the negative (NO), that is, Ppri≧0.2 MPa, the routine proceeds from step S11 to step S13.

At step S12, a check is made to determine whether primary pulley speed Npri, detected by primary pulley speed sensor 13, is less than a set rotational speed (a first predetermined rotational speed) such as 900 rpm. When the answer to step S12 is in the affirmative (YES), that is, Npri<900 rpm, the routine proceeds from step S12 to step S14. Conversely when the answer to step S12 is in the negative (NO), that is, Npri≧900 rpm, the routine proceeds from step S12 to step S13.

When the condition defined by the inequality Ppri<0.2 MPa and the condition defined by the inequality Npri<900 rpm are both satisfied, speed-change control section 12b foretells and determines that a slippage between drive belt 4 and each of primary and secondary pulleys 2 and 3 tends to occur owing to a drop in primary pulley pressure Ppri during a downshift, and thus the routine flows through steps S11 and S12 to step S14 so as to perform the belt slippage prevention speed-change control (described later). That is, these comparison check steps S11 and S12 of FIG. 5 function as a belt slippage foretelling section (or a belt slippage foretelling means) required to foretell and determine that the slippage between drive belt 4 and each pulley 2, 3 tends to occur owing to the primary pulley pressure drop during the downshift. On the contrary when either one of the condition defined by the inequality Ppri<0.2 MPa and the condition defined by the inequality Npri<900 rpm is unsatisfied, speed-change control section 12b determines that there is a less possibility for the slippage between drive belt 4 and each of primary and secondary pulleys 2 and 3 to occur owing to a drop in primary pulley pressure Ppri during a downshift, and thus the routine proceeds to step S13 so as to perform the normal speed-change control. The normal speed-change control of step S13 is executed as follows.

A vehicle speed VSP is estimated based on secondary pulley speed Nsec, detected by secondary pulley speed sensor 14, and then a desired input rotation speed to be transferred to the CVT is calculated or estimated or map-retrieved based on the vehicle speed VSP and accelerator opening APO from a predetermined VSP-APO versus desired input rotation speed characteristic map showing how the desired input rotation speed has to be varied relative to vehicle speed VSP and accelerator opening APO. A desired transmission ratio (or a desired pulley ratio) Ratio(0), suited to the current engine/vehicle operating conditions, such as the current vehicle speed and the current accelerator opening, is calculated as the quotient that is obtained by dividing the desired input rotation speed estimated by secondary pulley speed Nsec detected. Thereafter, the actual transmission ratio Ip (=Npri/Nsec) is arithmetically calculated by dividing primary pulley speed Npri detected by secondary pulley speed Nsec detected. After this, speed-change control section 12b calculates a ratio command signal value needed to gradually bring the actual transmission ratio Ip closer to the desired transmission ratio Ratio(0) at a target shifting speed, while simultaneously executing disturbance variable compensation. Then, at step S13, speed-change control section 12b calculates the number of steps of step motor 27, needed to realize or attain the ratio command signal value. The command signal, corresponding to the number of steps calculated through step S13, is output from speed-change control section 12b to step motor 27, thereby attaining desired transmission ratio Ratio(0) in accordance with the previously-discussed ratio changing operation.

In contrast to the above, in case that the condition defined by the inequality Ppri<0.2 MPa (see step S11) and the condition defined by the inequality Npri<900 rpm (see step S12) are both satisfied, speed-change control section 12b foretells and determines that a slippage between drive belt 4 and each of primary and secondary pulleys 2 and 3 tends to occur owing to a drop in primary pulley pressure Ppri during a downshift. In such a case, in order to prevent the occurrence of drive-belt slippage, the routine of FIG. 5 advances from step S11 via step S12 to step S14, so as to initiate the belt slippage prevention speed-change control. That is, step S14 functions as a primary-pulley-pressure drop inhibition section (or a primary-pulley-pressure drop inhibition means or a downshift inhibition means). Concretely, at step S14, an actual transmission ratio Ip(OLD), calculated before a set time period (for example, 100 msec) from a point of time when steps S11 and S12 (belt slippage foretelling means) have foretold and determined that the slippage between drive belt 4 and each pulley 2, 3 tends to occur owing to the primary pulley pressure drop during the downshift, is set as desired transmission ratio Ratio(0), that is, Ratio(0)=Ip(OLD). Additionally, at step S14, speed-change control section 12b calculates the number of steps of step motor 27, needed to bring actual transmission ratio Ip closer to desired transmission ratio Ratio(0) (=Ip(OLD)). The command signal, corresponding to the number of steps calculated through step S14, is output from speed-change control section 12b to step motor 27, thereby attaining desired transmission ratio Ratio(0) (=Ip(OLD)), in accordance with the previously-discussed ratio changing operation. According to the aforementioned belt slippage prevention speed-change control (or the primary-pulley-pressure drop inhibition control of step S14), it is possible to actually practically inhibit an undesirable downshift, in other words, an undesirable drop in primary pulley pressure Ppri. That is, the downshift is inhibited, and thus a shift to the actual transmission ratio Ip(OLD), calculated before the set time period (e.g., 100 msec) from the time when steps S11 and S12 (belt slippage foretelling means) have foretold and determined that there is an increased tendency of the occurrence of drive-belt slippage, is made. The aforementioned shift to the actual transmission ratio Ip(OLD), calculated before the set time period (e.g., 100 msec), means an upshift. Such an upshift results in a rise in primary pulley pressure Ppri, and therefore it is possible to certainly prevent the drive-belt slippage from occurring undesiredly during the shifting operation, in particular, during the downshift.

In a similar manner to comparison check steps S11 and S12, steps S15 and S16 also function as a belt slippage foretelling section (or a belt slippage foretelling means) required to foretell and determine that the slippage between drive belt 4 and each pulley 2, 3 tends to occur owing to the primary pulley pressure drop during the downshift.

At step S15, a comparison check is made to determine whether primary pulley pressure Ppri, detected by primary pulley pressure sensor 16, is higher than or equal to a second set pressure level (a second predetermined pressure level), such as 0.3 MPa, which is set to be higher than the set pressure level, such as 0.2 MPa, used at step S11. When the answer to step S15 is in the affirmative (Ppri≧0.3 MPa), the routine proceeds from step S15 to step S13. Conversely when the answer to step S15 is in the negative (Ppri<0.3 MPa), the routine proceeds from step S15 to step S16.

At step S16, a comparison check is made to determine whether primary pulley speed Npri, detected by primary pulley speed sensor 13, is greater than or equal to a second set rotational speed (a second predetermined rotational speed), such as 1000 rpm, which is set to be higher than the set rotational speed, such as 900 rpm, used at step S12. When the answer to step S16 is in the affirmative (Npri≧1000 rpm), the routine proceeds from step S16 to step S13. Conversely when the answer to step S16 is in the negative (Npri<1000 rpm), the routine returns from step S16 to step S15.

As can be appreciated from the closed loop that the routine proceeds from step S15 to step S16, and then returns from step S16 back to step S15, comparison check steps S15 and S16 are repeatedly executed, until either one of the condition defined by the inequality Ppri≧0.3 MPa (see step S15) and the condition defined by the inequality Npri≧1000 rpm (see step S16) is satisfied. By way of repetition of comparison check steps S15 and S16, the drive-belt slippage foretelling state is continued, and as a result it is possible to hold the ratio-change operating mode (or the ratio-change operating state of step S14) that the previously-discussed actual transmission ratio Ip(OLD), calculated before the set time period (for example, 100 msec) from the time just when the occurrence of belt slippage between drive belt 4 and each pulley 2, 3 has been foretold and determined, is set as desired transmission ratio Ratio(0), for a while.

In contrast to the above, as soon as either one of the condition defined by the inequality Ppri≧0.3 MPa (see step S15) and the condition defined by the inequality Npri≧1000 rpm (see step S16) is satisfied, speed-change control section 12b determines that there is a less possibility of the occurrence of slippage between drive belt 4 and each of primary and secondary pulleys 2 and 3 owing to a drop in primary pulley pressure Ppri during a downshift, and thus terminates foretelling the occurrence of drive-belt slippage. Therefore, the routine proceeds from either of steps S15 and S16 to step S13 to recover from the belt slippage prevention speed-change control (the primary-pulley-pressure drop inhibition control) to the normal speed-change control.

The normal speed-change control, executed at step S13, terminates immediately when a decision result of step S17 becomes switched from negative (VSP≧3 km/h) to positive (VSP<3 km/h). The positive answer (VSP<3 km/h) to step S17 means that vehicle speed VSP is less than a limit value (or a predetermined vehicle-speed threshold such as 3 km/h) for measurement of vehicle speed VSP. On the contrary, the negative answer (VSP≧3 km/h) to step S17 means that vehicle speed VSP is greater than or equal to the limit value (or the first predetermined vehicle-speed threshold value such as 3 km/h) for measurement of vehicle speed VSP. Immediately when the answer to step S17 is switched from negative (VSP≧3 km/h) to positive (VSP<3 km/h), that is, vehicle speed VSP becomes less than the limit value (e.g., 3 km/h) for measurement of the vehicle speed, the normal speed-change control is terminated and the control mode is switched to a ratio-changing operation (or a speed-change control mode) of step S18.

At step S18, speed-change control section 12b executes the speed-change control mode that an actual transmission ratio Ip(OLD), calculated before a set time period (for example, 100 msec) from the current execution cycle, is set as desired transmission ratio Ratio(0).

The speed-change control mode of step S18 is repeatedly executed, until a decision result of step S19 becomes switched from negative (VSP<5 km/h) to positive (VSP≧5 km/h). The negative answer (VSP<5 km/h) to step S19 means that vehicle speed VSP is less than a second set vehicle speed (or a second predetermined vehicle-speed threshold value) such as 5 km/h higher than the limit value (or the predetermined vehicle-speed threshold such as 3 km/h) for measurement of vehicle speed VSP, and thus the vehicle is substantially in the stopped state. On the contrary, the positive answer (VSP≧5 km/h) to step S19 means that vehicle speed VSP is greater than or equal to the second set vehicle speed (or the second predetermined vehicle speed) such as 5 km/h higher than the limit value (or the predetermined vehicle-speed threshold such as 3 km/h) for measurement of vehicle speed VSP. Briefly speaking, the negative answer (VSP<5 km/h) to step S19 means almost the vehicle's stopped state, whereas the positive answer (VSP≧5 km/h) to step S19 means the vehicle's non-stopped state. Thus, step S19 will be hereinafter referred to as a "vehicle's stopped/unstopped state decision step", and the speed-change control mode of step S18 will be hereinafter referred to as a "vehicle's stopping period speed-change control mode". One cycle of the routine of FIG. 5 terminates immediately when vehicle speed VSP becomes higher than the second set vehicle speed such as 5 km/h.

Figure 6A:
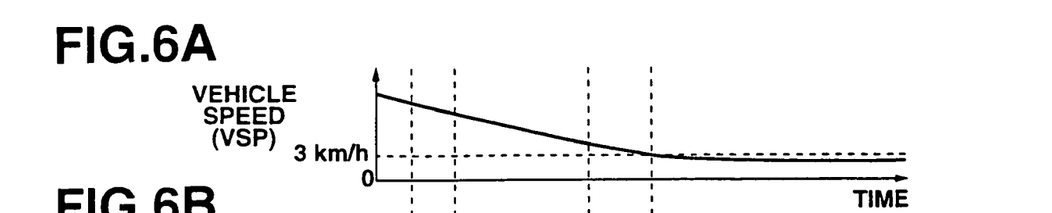
FIGS. 6A-6E are time charts explaining the ratio changing operation of the speed-change control section of the CVT controller executing the speed-change control program of FIG. 5, respectively showing variations of vehicle speed VSP, variations of primary pulley speed Npri, variations of primary pulley pressure Ppri, variations of desired transmission ratio Ratio(0) and actual transmission ratio Ip, and step-motor position Step.
Figure 6B:
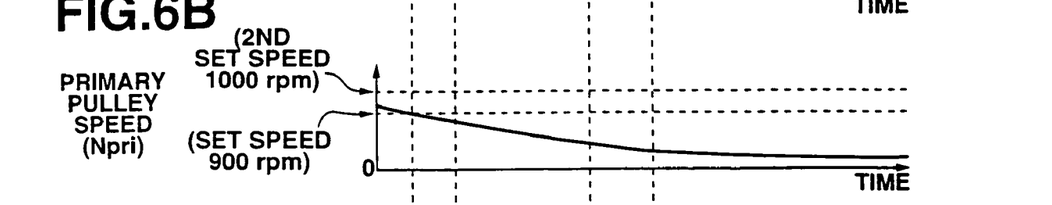
Figure 6C:
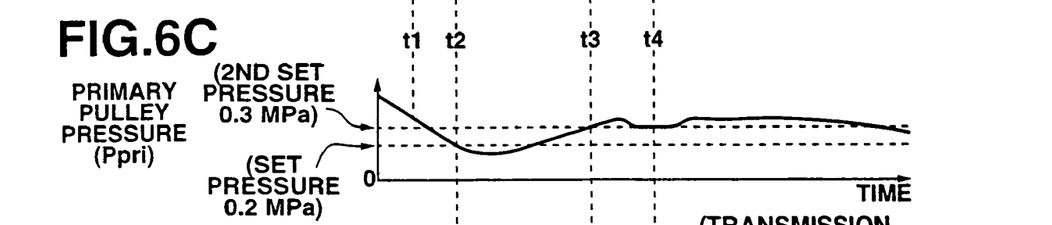
Figure 6D:
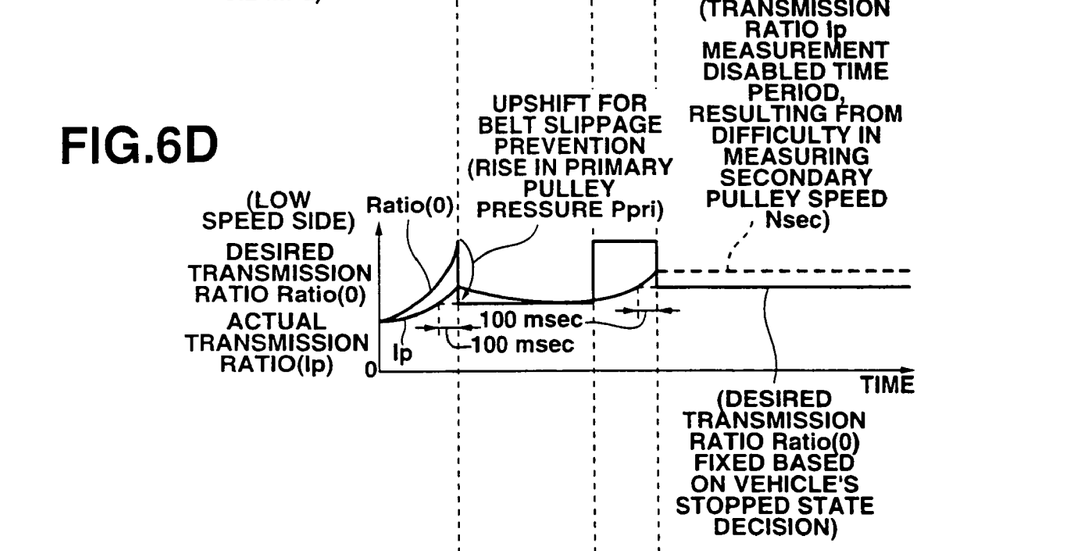
Figure 6E:
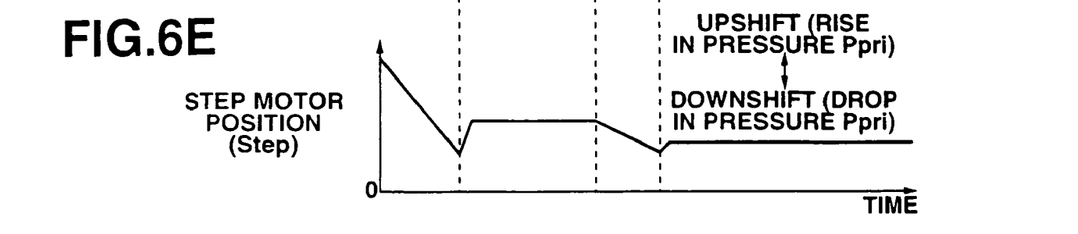

The ratio changing operation executed by speed-change control section 12b of CVT controller 12 is hereinafter explained in reference to the flow charts of FIGS. 6A-6E. FIGS. 6A-6E show characteristic curves obtained during the belt slippage prevention speed-change control, executed by the system of the embodiment, under an initial condition that vehicle speed VSP gradually drops (see FIG. 6A) due to the vehicle's deceleration, and the step-motor position Step of step motor 27 shifts downwards (see the early rapidly down-sloped characteristic curve shown in FIG. 6E), and a drop in primary pulley pressure Ppri occurs (see the early stage of the characteristic curve shown in FIG. 6C). At the early stage, as shown in FIG. 6B, primary pulley speed Npri becomes less than the set rotational speed (e.g., 900 rpm) at the time t1. Thereafter, with the primary pulley speed Npri maintained at a value less than the set rotational speed (e.g., 900 rpm), as shown in FIG. 6C, primary pulley pressure Ppri becomes less than the set pressure level (e.g., 0.2 MPa) at the time t2. In this manner, when the condition defined by the inequality Npri<900 rpm (see step S12) and the condition defined by the inequality Ppri<0.2 MPa (see step S11) are both satisfied, speed-change control section 12b foretells and determines that a slippage between drive belt 4 and each of primary and secondary pulleys 2 and 3 tends to occur owing to a drop in primary pulley pressure Ppri during a downshift. As the time t2 when the occurrence of drive-belt slippage has been foretold, the routine of FIG. 5 proceeds to step S14. Thus, an actual transmission ratio Ip(OLD), calculated before the set time period (e.g., 100 msec) from the time t2 when the occurrence of drive-belt slippage has been foretold, is set as a desired transmission ratio Ratio(0), that is, Ratio(0)=Ip(OLD) (see a rapid fall of desired transmission ratio Ratio(0) to the actual transmission ratio Ip(OLD), calculated before the set time period (e.g., 100 msec) from t2 in FIG. 6D). Responsively to the rapid fall of desired transmission ratio Ratio(0) to actual transmission ratio Ip(OLD), the step-motor position Step of step motor 27 is shifted upwards (see the rapidly up-sloped characteristic curve shown in FIG. 6E just after t2). In accordance with the belt slippage prevention speed-change control, that is, in accordance with the primary-pulley-pressure drop inhibition mode of step S14, practically, the downshift is inhibited, in other words, the drop in primary pulley pressure Ppri is inhibited. That is, an upshift to the actual transmission ratio Ip(OLD), calculated before the set time period (e.g., 100 msec) from t2, is made. Such an upshift certainly prevents the undesired drive-belt slippage from occurring due to the rise in primary pulley pressure Ppri during the downshifting operation.

The ratio-change operating state of step S14 suited to belt slippage prevention, continues until the time t3 that primary pulley pressure Ppri becomes higher than or equal to the second set pressure level, such as 0.3 MPa (see step S15). After t3, there is a less possibility of the occurrence of slippage between drive belt 4 and each of pulleys 2 and 3, and thus the speed-change control mode is switched or recovered from the belt slippage prevention speed-change control to the normal speed-change control. Thus, just after t3, desired transmission ratio Ratio(0) is increased up to a ratio (see the ratio set during a time period from t3 to t4 in FIG. 6D), which is suited for the normal speed-change control mode and calculated as the quotient obtained by dividing the desired input rotation speed estimated based on the current engine/vehicle operating conditions, such as the current vehicle speed and the current accelerator opening by secondary pulley speed Nsec detected. During the normal speed-change control mode (during the time period t3-t4), responsively to the deviation (Ratio(0)-Ip) between desired transmission ratio Ratio(0) and actual transmission ratio Ip, step motor 27 is controlled such that the step-motor position Step moderately shifts downwards (seethe moderately down-sloped characteristic curve shown in the time period t3-t4 of FIG. 6E).

The normal speed-change control (see the time period t3-t4 of FIG. 6D) terminates at the time t4 when vehicle speed VSP becomes less than the limit value (or the predetermined vehicle-speed threshold such as. 3 km/h) for measurement of the vehicle speed. Just after t4, the control mode is switched from the normal speed-change control mode to the vehicle's stopping period speed-change control mode of step S18. Thus, just after t4, the vehicle's stopping period speed-change control mode of step S18 that an actual transmission ratio Ip(OLD), calculated before a set time period (e.g., 100 msec) from the current execution cycle, is set as a desired transmission ratio Ratio(0) is repeatedly executed, until the vehicle's stopped/unstopped state decision step S19 determines that vehicle speed VSP becomes higher than the second set vehicle speed such as 5 km/h. After t4, actually, it is impossible to satisfactorily measure or detect secondary pulley speed Nsec, based on which vehicle speed VSP is estimated, and thus it is impossible to arithmetically calculate actual transmission ratio Ip (=Npri/Nsec). For the reasons set out above, from the time t4 of FIG. 6D, as a matter of convenience, the actual transmission ratio Ip is indicated by the phantom line.

As will be appreciated from the above, according to the belt slippage prevention apparatus of the embodiment, when comparison check steps S11 and S12 of FIG. 5 foretell and determine that a slippage between the drive belt and each of the primary and secondary pulleys tends to occur under a condition where primary pulley pressure Ppri is dropping for a downshift performed during deceleration (see t2 of FIGS. 6A-6E), an actual transmission ratio Ip(OLD), calculated before a set time period (for example, 100 msec) from the time t2, is set as a desired transmission ratio Ratio(0) (=Ip(OLD)), by means of primary-pulley-pressure drop inhibition step S14. Such an upshift to the newly updated desired transmission ratio Ratio(0) (=Ip(OLD)), does not only inhibit primary pulley pressure Ppri from further dropping, the upshift also results in a rise in primary pulley pressure Ppri. This certainly prevents the occurrence of undesirable drive-belt slippage, thus avoiding the durability of the drive belt, that is, the durability of the CVT itself from remarkably lowering. Instead of using a way that both of primary and secondary pulley pressures Ppri and Psec are held at respective high pressure levels, only when there is an increased tendency of the occurrence of belt slippage, a primary-pulley-pressure drop performed for the purpose of a downshift is certainly inhibited and practically primary pulley pressure Ppri is suitably risen by the system of the embodiment. Therefore, it is possible to avoid a wasteful increase in the load on the engine-driven oil pump that produces the line pressure, thus improving fuel economy.

Additionally, according to the system of the embodiment, in foretelling the occurrence of belt slippage, the condition defined by the inequality Ppri<0.2 MPa (see step S11) and the condition defined by the inequality Npri<900 rpm (see step S12) are used. Primary pulley pressure Ppri and primary pulley speed Npri both satisfactorily signify a premonitory sign of the occurrence of belt slippage. Thus, by way of both of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm), it is possible to more accurately foretell or predict the occurrence of belt slippage.

Furthermore, the system of the embodiment determines that there is a less possibility of the occurrence of belt slippage between the drive belt and each of the primary and secondary pulleys, when either one of the condition defined by the inequality Ppri≧0.3 MPa (see step S15) and the condition defined by the inequality Npri≧1000 rpm (see step S16) is satisfied. The second set pressure level (the second predetermined pressure level), such as 0.3 MPa, used at step S15, is set to be higher than the set pressure level, such as 0.2 MPa, used at step S11. On the other hand, the second set rotational speed (the second predetermined rotational speed), such as 1000 rpm, used at step S16, is set to be higher than the set rotational speed, such as 900 rpm, used at step S12. In other words, in order to estimate or foretell the transition between the drive-belt slippage state and the drive-belt non-slippage state, a proper hysteresis such as 0.1 MPa (=0.3 MPa−0.2 MPa) and a proper hysteresis such as 100 rpm (=1000 rpm−900 rpm), are provided, thereby preventing undesired hunting of the control system, and thus ensures stable belt-slippage foretelling operation.

In the shown embodiment, in foretelling the occurrence of belt slippage, both of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm) are used (see the flow from step S11 via step S12 to step S14 in FIG. 5). In lieu thereof, step S12 of the routine of FIG. 5 may be omitted and thus only the comparison check (step S11) of primary pulley pressure Ppri to the set pressure level (i.e., Ppri<0.2 MPa) maybe used to foretell the occurrence of belt slippage. From the viewpoint of the accuracy of foretelling the occurrence of belt slippage, only the comparison check (step S11) of primary pulley pressure Ppri to the set pressure level (i.e., Ppri<0.2 MPa) is somewhat inferior to both of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm). However, a drop in primary pulley pressure Ppri is a first factor in the occurrence of belt slippage, and thus it is possible to certainly foretell or predict the occurrence of belt slippage. On the other hand, a low speed value of primary pulley speed Npri is a second factor in the occurrence of belt slippage.

In foretelling the occurrence of belt slippage, instead of using a combination of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm), a combination of the comparison check of primary pulley pressure Ppri to the set pressure level (i.e., Ppri<0.2 MPa) and the comparison check of vehicle speed VSP to the vehicle-speed-measurement limit value (i.e., VSP<3 km/h) may be used to foretell the occurrence of belt slippage. A low speed range of vehicle speed VSP is a third factor in the occurrence of belt slippage. In case of the combination of these comparison checks (i.e., Ppri<0.2 MPa and VSP<3 km/h), it is possible to certainly foretell or predict the occurrence of belt slippage, since a drop in primary pulley pressure Ppri is the first factor in the occurrence of belt slippage and the drive-belt slippage is particularly apt to occur at a low vehicle speed range.

Furthermore, in foretelling the occurrence of belt slippage, instead of using a combination of the comparison check (step S11) of primary pulley pressure Ppri to the set pressure level (i.e., Ppri<0.2 MPa) and the comparison check (step S12) of primary pulley speed (the second factor) Npri to the set rotational speed (Npri<900 rpm), a combination of the comparison check of primary pulley pressure (the first factor) Ppri to the set pressure level (i.e., Ppri<0.2 MPa), the comparison check of vehicle speed (the third factor) VSP to the vehicle-speed-measurement limit value (i.e., VSP<3 km/h), and the comparison check of primary pulley speed (the second factor) Npri to the set rotational speed (i.e., Npri<900 rpm) may be used to foretell the occurrence of belt slippage. In case of the combination of these comparison checks (i.e., Ppri<0.2 MPa and VSP<3 km/h and Npri<900 rpm), it is possible to more certainly and reliably foretell or predict the occurrence of belt slippage, since a drop in primary pulley pressure Ppri is the first factor in the occurrence of belt slippage and the drive-belt slippage is particularly apt to occur at a low vehicle speed range (corresponding to the third factor) and/or at a low CVT input rotation speed range (corresponding to the second factor).

In addition to the above, it is preferable to set the previously-discussed set pressure (for example, 0.2 MPa) for primary pulley pressure Ppri to a pressure level lower than required primary pulley pressure Ppri* by a predetermined pressure. This is because required primary pulley pressure Ppri* is usually determined and set to a somewhat low-pressure level, taking into account a margin by which belt slippage is prevented from occurring. Thus, in determining the set pressure (for example, 0.2 MPa) for primary pulley pressure Ppri, based on required primary pulley pressure Ppri*, which is used as a reference needed to determine the set pressure for primary pulley pressure Ppri, it is desirable to set the aforementioned set pressure (for example, 0.2 MPa) to a pressure level lower than required primary pulley pressure Ppri* by a predetermined pressure. Such setting of the set pressure (e.g., 0.2 MPa) enhances the accuracy to foretell belt slippage based on primary pulley pressure Ppri.

In the shown embodiment, required primary pulley pressure Ppri* is map-retrieved based on the actual transmission ratio Ip and transmission input torque Ti from the predetermined actual transmission ratio Ip versus required primary pulley pressure Ppri* characteristic map shown in FIG. 4. Instead of using the predetermined actual transmission ratio Ip versus required primary pulley pressure Ppri* characteristic map of FIG. 4, required primary pulley pressure Ppri* may be arithmetically calculated as follows.

$$Ppri^* = \{(P_{TH} - P_{CENT})/Apri\} \times M$$

where $P_{TH}$ denotes a required primary pulley thrust, $P_{CENT}$ denotes a primary pulley centrifugal force, Apri denotes a primary-pulley pressure receiving area, and M denotes a predetermined margin for required primary pulley pressure Ppri*.

The previously-noted required primary pulley thrust $P_{TH}$ is arithmetically calculated from the following expression.

$$P_{TH} = (Ti \times \cos\theta)/(2 \times \mu \times Rpri)$$

where Ti denotes the transmission input torque (CVT input torque), θ denotes an inclined angle of the wall surface of the V-grooved primary pulley, μ denotes a friction coefficient of drive belt 4, and Rpri denotes a contact radius of primary pulley 2.

The previously-noted primary-pulley contact radius Rpri of primary pulley 2 is arithmetically calculated from the following expression.

$$Rpri = (L_A/2) \times 1/(Ip-1)^2 \times \{(-\pi[Ip+1]) + [\pi^2 \times [Ip+1]^2 - 4[Ip-1]^2/L_A \times (2 \times L_A - L_B)]^{1/2}\}$$

where LA denotes a center distance between the axis of primary pulley 2 and the axis of secondary pulley 3, Ip denotes the actual transmission ratio, π denotes a ratio of the circumference of a circle to its diameter, and LB denotes the circumference (the circumference length) of drive belt 4.

As discussed previously, in foretelling the occurrence of belt slippage, the belt slippage prevention apparatus can use only the first factor, that is, primary pulley pressure Ppri (<0.2 MPa) or a proper combination of primary pulley pressure Ppri (the first factor) with at least one of the other factors, namely the second factor, i.e., primary pulley speed Npri (<900 rpm) and the third factor, i.e., vehicle speed VSP (<3 km/h). Also, a vehicle's deceleration rate α may be used as an additional factor that is usable for foretelling belt slippage between drive belt 4 and each of primary and secondary pulleys 2 and 3, because there is an increased tendency for the drive-belt slippage to occur during a rapid deceleration. In such a case, when vehicle's deceleration rate α is greater than or equal to a set deceleration rate (or a predetermined deceleration rate) $\alpha_0$, speed-change control section 12b foretells and determines that a slippage between drive belt 4 and each of primary and secondary pulleys 2 and 3 tends to occur owing to such a great deceleration rate. That is, a high magnitude of vehicle's deceleration rate α is a fourth factor in the occurrence of belt slippage. For the reasons discussed above, a combination of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm) may be replaced with a comparison check of vehicle's deceleration rate α to the set deceleration rate (i.e., $\alpha \geq \alpha_0$). In case of the use of vehicle's deceleration rate α, it is possible to easily foretell the occurrence of drive-belt slippage.

As a first modification, in foretelling the occurrence of belt slippage, a combination of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm) may be replaced with a combination of the comparison check of vehicle's deceleration rate α to the set deceleration rate (i.e., $\alpha \geq \alpha_0$) and the comparison check of vehicle speed VSP to the vehicle-speed-measurement limit value (i.e., VSP<3 km/h). In case of the first modification (a combination of $\alpha \geq \alpha_0$ and VSP<3 km/h), the low vehicle speed range (corresponding to the third factor) as well as the rapid deceleration period (corresponding to the fourth factor) can be taken into account for foretelling the occurrence of belt slippage, and whereby it is possible to more accurately certainly foretell the occurrence of belt slippage.

As a second modification, in foretelling the occurrence of belt slippage, a combination of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm) may be replaced with a combination of the comparison check of vehicle's deceleration rate a to the set deceleration rate (i.e., $\alpha \geq \alpha_0$) and the comparison check of primary pulley speed Npri to the set rotational speed (i.e., Npri<900 rpm). In such a case, when vehicle's deceleration rate α is greater than or equal to set deceleration rate $\alpha_0$ (i.e., $\alpha \geq \alpha_0$) and primary pulley speed Npri is less than the set rotational speed (i.e., Npri<900 rpm), speed-change control section 12b foretells and determines that a slippage between drive belt 4 and each of primary and secondary pulleys 2 and 3 tends to occur owing to such vehicle/engine operating conditions. In case of the second modification (a combination of $\alpha \geq \alpha_0$ and Npri<900 rpm), the low CVT input rotation speed range (corresponding to the second factor) as well as the magnitude of vehicle's deceleration rate a can be taken into account for foretelling the occurrence of belt slippage, and whereby it is possible to more accurately certainly foretell the occurrence of belt slippage.

As a third modification, in foretelling the occurrence of belt slippage, a combination of the comparison check (step S11) of primary pulley pressure Ppri to the set pressure level (i.e., Ppri<0.2 MPa) and the comparison check (step S12) of primary pulley speed Npri to the set rotational speed (i.e., Npri<900 rpm) may be replaced with a combination of the comparison check of vehicle's deceleration rate α to the set deceleration rate (i.e., $\alpha \geq \alpha_0$), the comparison check of vehicle speed VSP to the vehicle-speed-measurement limit value (i.e., VSP<3 km/h), and the comparison check of primary pulley speed Npri to the set rotational speed (i.e., Npri<900 rpm). In such a case, when vehicle's deceleration rate α is greater than or equal to set deceleration rate $\alpha_0$ (i.e., $\alpha < \alpha_0$), and vehicle speed VSP is less than the vehicle-speed-measurement limit value (i.e., VSP<3 km/h), and primary pulley speed Npri is less than the set rotational speed (i.e., Npri<900 rpm), speed-change control section 12b foretells and determines that a slippage between drive belt 4 and each of primary and secondary pulleys 2 and 3 tends to occur owing to such vehicle/engine operating conditions. In case of the third modification (a combination of $\alpha \geq \alpha_0$ and VSP<3 km/h and Npri<900 rpm), the low CVT input rotation speed range (corresponding to the second factor), the low vehicle speed range (corresponding to the third factor), and the magnitude of vehicle's deceleration rate α can be all taken into account for foretelling the occurrence of belt slippage, and whereby it is possible to more accurately certainly foretell the occurrence of drive-belt slippage.

In the shown embodiment, as a countermeasure to belt slippage prevention, the actual transmission ratio Ip(OLD), calculated before the set time period (for example, 100 msec) from a point of time when the occurrence of slippage between drive belt 4 and each pulley 2, 3 has been foretold and determined owing to the primary pulley pressure drop during the downshift, is set as desired transmission ratio Ratio(0), that is, Ratio(0)=Ip(OLD), and a command signal corresponding to the actual transmission ratio Ip(OLD), calculated before the set time period (for example, 100 msec), is output to the ratio-change control actuator, that is, step motor 27, as the desired transmission ratio Ratio(0) (=Ip(OLD),. Additionally, when executing such a primary-pulley-pressure drop inhibition mode or such a downshift inhibition mode (see step S14), practically, the undesired downshift is inhibited and in lieu thereof an upshift to the actual transmission ratio Ip(OLD), calculated before the set time period (e.g., 100 msec), is performed, so as to certainly prevent belt slippage by a rise in primary pulley pressure Ppri arising from such an upshift. In order to more easily achieve the same operation and effect as discussed above, instead of resetting desired transmission ratio Ratio(0) to the actual transmission ratio Ip(OLD), calculated before the set time period (for example, 100 msec), and re-calculating the angular position of step motor 27, the angular position of the ratio-change control actuator (step motor 27) may be returned to the operative position obtained before the set time period, for example, 100 msec, from the time when the occurrence of belt slippage has been foretold. In this case, it is possible to eliminate resetting the desired transmission ratio, that is, Ratio(0)=Ip(OLD), and re-calculation of the angular position of the ratio-change control actuator (step motor 27).

As discussed above, in the primary-pulley-pressure drop inhibition mode or in the downshift inhibition mode, practically, the upshift to the actual transmission ratio Ip(OLD), calculated before the set time period (e.g., 100 msec), is performed, so as to certainly prevent undesired belt slippage by the primary-pulley-pressure rise. In lieu of such an upshift to the actual transmission ratio Ip(OLD), a ratio-change operating state obtained when the occurrence of slippage between drive belt 4 and each pulley 2, 3 has been foretold and determined, may be held and retained unchanged. By holding and retaining the ratio-change operating state obtained when the occurrence of belt slippage has been foretold, primary pulley pressure Ppri can be held at a pressure level produced when the occurrence of slippage between drive belt 4 and each pulley 2, 3 has been foretold and determined, thus inhibiting primary pulley pressure Ppri from further dropping, and consequently preventing undesired belt slippage. In such a case, it is possible to easily achieve almost the same operation and effect as discussed above, by holding the angular position of the ratio-change control actuator (step motor 27) at the operative position obtained at the point of time when the occurrence of belt slippage has been foretold.

When executing an upshift to the actual transmission ratio Ip(OLD), calculated before the set time period (e.g., 100 msec), to prevent belt slippage, a transmission ratio of the relatively higher speed side as compared with the ratio-change operating state obtained when the occurrence of belt slippage has been foretold, may be set to desired transmission ratio Ratio(0), and then a command signal corresponding to the transmission ratio of the relatively higher speed side may be output to the ratio-change control actuator (step motor 27). In such case, during the primary-pulley-pressure drop inhibition mode or during the downshift inhibition mode, practically, an upshift to the transmission ratio of the relatively higher speed side is performed, thus certainly preventing undesired belt slippage from occurring by the primary-pulley-pressure rise arising from such an upshift. The degree of freedom of selection of the transmission ratio of the relatively higher speed side is high, thus enhancing the design flexibility. For instance, a predetermined maximum gear ratio (a maximum pulley ratio) corresponding to the highest speed side may be selected as the transmission ratio of the relatively higher speed side as compared with the ratio-change operating state obtained when the occurrence of belt slippage has been foretold. Setting desired transmission ratio Ratio(0) to the predetermined maximum ratio (of the highest speed side) more certainly reliably prevents the occurrence of belt slippage.

In the shown embodiment, undesired belt slippage is prevented from occurring by way of the speed-change control. Instead of performing the speed-change control for belt slippage prevention by means of the ratio-change control actuator (step motor 27), line pressure PL, which is used as an initial pressure for primary pulley pressure Ppri, may be relatively risen as compared with the line pressure level produced when the occurrence of belt slippage between the drive belt and each of the primary and secondary pulleys has been foretold. Such a rise in line pressure PL enables primary pulley pressure Ppri to rise, thereby certainly preventing undesired belt slippage.

The entire contents of Japanese Patent Application No. 2002-287027 (filed Sep. 30, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A slippage prevention apparatus of a belt-drive continuously variable transmission for an automotive vehicle, which employs a primary variable-width pulley of an input side, a secondary variable-width pulley of an output side, and a drive belt running in the primary and secondary pulleys, and whose downshift is made by an increase in a V-groove width of the primary pulley arising from a drop in a primary pulley pressure supplied to the primary pulley and a decrease in the V-groove width of the secondary pulley occurring in synchronism with the drop in the primary pulley pressure, or by a decrease in a V-groove width of the secondary pulley arising from a rise in a secondary pulley pressure supplied to the secondary pulley and an increase in the V-groove width of the primary pulley occurring in synchronism with the rise in the secondary pulley pressure, comprising:

a speed-change control valve being responsive to a relative-position relationship between a position of a movable flange of the primary pulley and a position of a ratio-change control actuator for switching its valve position among a neutral position, a pressure build-up position in which the primary pulley pressure is supplied to a primary pulley actuation chamber of the primary pulley, and a pressure reduction position in which the primary pulley pressure is drained from the primary pulley actuation chamber;

a belt slippage foretelling section that foretells that a slippage between the drive belt and each of the primary and secondary pulleys tends to occur when the primary pulley pressure is dropping during the downshift; and a primary-pulley-pressure drop inhibition section that inhibits the primary pulley pressure from dropping by switching the speed-change control valve to either one of the neutral position and the pressure build-up position, when the belt slippage foretelling section foretells that the slippage between the drive belt and each of the primary and secondary pulleys tends to occur during the downshift.

2. The slippage prevention apparatus as claimed in claim 1, wherein:

the belt slippage foretelling section foretells that the slippage between the drive belt and each of the primary and secondary pulleys tends to occur, when the primary pulley pressure is less than a first predetermined pressure level and a primary pulley speed is less than a first predetermined rotational speed.

3. The slippage prevention apparatus as claimed in claim 2, wherein:

the belt slippage foretelling section determines that there is a less possibility for the slippage between the drive belt and each of the primary and secondary pulleys to occur, when the primary pulley pressure is higher than or equal to a second predetermined pressure level higher than the first predetermined pressure level, or when the primary pulley speed is greater than or equal to a second predetermined rotational speed higher than the first predetermined rotational speed.

4. The slippage prevention apparatus as claimed in claim 2, wherein:
the first predetermined pressure level for the primary pulley pressure is set to a pressure level lower than a required primary pulley pressure, which is determined based on an actual transmission ratio and a transmission input torque, by a predetermined pressure.

5. The slippage prevention apparatus as claimed in claim 1, wherein:
the belt slippage foretelling section foretells that the slippage between the drive belt and each of the primary and secondary pulleys tends to occur, when the primary pulley pressure is less than a first predetermined pressure level.

6. The slippage prevention apparatus as claimed in claim 1, wherein:
the belt slippage foretelling section foretells that the slippage between the drive belt and each of the primary and secondary pulleys tends to occur, when the primary pulley pressure is less than a first predetermined pressure level and a vehicle speed is less than a predetermined vehicle-speed threshold value.

7. The slippage prevention apparatus as claimed in claim 1, wherein:
the belt slippage foretelling section foretells that the slippage between the drive belt and each of the primary and secondary pulleys tends to occur, when the primary pulley pressure is less than a first predetermined pressure level, and a vehicle speed is less than a predetermined vehicle-speed threshold value, and a primary pulley speed is less than a first predetermined rotational speed.

8. The slippage prevention apparatus as claimed in claim 1, wherein:
the belt slippage foretelling section foretells that the slippage between the drive belt and each of the primary and secondary pulleys tends to occur, when a vehicle's deceleration rate is greater than or equal to a predetermined deceleration rate.

9. The slippage prevention apparatus as claimed in claim 1, wherein:
the belt slippage foretelling section foretells that the slippage between the drive belt and each of the primary and secondary pulleys tends to occur, when a vehicle's deceleration rate is greater than or equal to a predetermined deceleration rate and a vehicle speed is less than a predetermined vehicle-speed threshold value.

10. The slippage prevention apparatus as claimed in claim 1, wherein:
the belt slippage foretelling section foretells that the slippage between the drive belt and each of the primary and secondary pulleys tends to occur, when a vehicle's deceleration rate is greater than or equal to a predetermined deceleration rate and a primary pulley speed is less than a first predetermined rotational speed.

11. The slippage prevention apparatus as claimed in claim 1, wherein:
the belt slippage foretelling section foretells that the slippage between the drive belt and each of the primary and secondary pulleys tends to occur, when a vehicle's deceleration rate is greater than or equal to a predetermined deceleration rate, and a vehicle speed is less than a predetermined vehicle-speed threshold value, and a primary pulley speed is less than a first predetermined rotational speed.

12. The slippage prevention apparatus as claimed in claim 1, wherein:
the primary-pulley-pressure drop inhibition section sets an actual transmission ratio, which is calculated before a set time period from a time when the slippage between the drive belt and each of the primary and secondary pulleys has been foretold, to a desired transmission ratio, and outputs a command signal corresponding to the desired transmission ratio to a ratio-change control actuator.

13. The slippage prevention apparatus as claimed in claim 12, wherein:
the primary-pulley-pressure drop inhibition section returns the ratio-change control actuator to an operative position obtained before the set time period from the time when the slippage between the drive belt and each of the primary and secondary pulleys has been foretold.

14. The slippage prevention apparatus as claimed in claim 1, wherein:
the primary-pulley-pressure drop inhibition section holds a ratio-change operating state obtained when the slippage between the drive belt and each of the primary and secondary pulleys has been foretold.

15. The slippage prevention apparatus as claimed in claim 1, wherein:
the primary-pulley-pressure drop inhibition section sets a transmission ratio of a relatively higher speed side as compared with a ratio-change operating state obtained when the slippage between the drive belt and each of the primary and secondary pulleys has been foretold, to a desired transmission ratio, and outputs a command signal corresponding to the desired transmission ratio set to the transmission ratio of the relatively higher speed side to a ratio-change control actuator.

16. The slippage prevention apparatus as claimed in claim 15, wherein:
the primary-pulley-pressure drop inhibition section sets a predetermined maximum pulley ratio to the desired transmission ratio, and outputs a command signal corresponding to the desired transmission ratio set to the predetermined maximum pulley ratio to the ratio-change control actuator.

17. The slippage prevention apparatus as claimed in claim 1, wherein:
the primary-pulley-pressure drop inhibition section further executes, with the speed-change control valve kept in the pressure build-up position, pressure-rise control for rising a line pressure, which is used as an initial pressure for the primary pulley pressure, to a higher pressure value as compared with a line pressure level produced when the slippage between the drive belt and each of the primary and secondary pulleys has been foretold.

18. A method of preventing a slippage between each of a primary variable-width pulley of an input side and a secondary variable-width pulley of an output side and a drive belt running in the primary and secondary pulleys, all employed in a belt-drive continuously variable transmission for an automotive vehicle whose downshift is made by an increase in a V-groove width of the primary pulley arising from a drop in a primary pulley pressure supplied to the primary pulley and a decrease in the V-groove width of the secondary pulley occurring in synchronism with the drop in the primary pulley pressure, or by a decrease in a V-groove width of the secondary pulley arising from a rise in a secondary pulley pressure supplied to the secondary pulley and an increase in the V-groove width of the primary pulley occurring in synchronism with the rise in the secondary pulley pressure, the method comprising:

providing a speed-change control valve being responsive to a relative-position relationship between a position of a movable flange of the primary pulley and a position of a ratio-change control actuator for switching its valve position among a neutral position, a pressure build-up position in which the primary pulley pressure is supplied to a Primary pulley actuation chamber of the primary pulley, and a pressure reduction position in which the primary pulley pressure is drained from the primary pulley actuation chamber;

foretelling that the slippage between the drive belt and each of the primary and secondary pulleys tends to occur when the primary pulley pressure is dropping during the downshift; and inhibiting the primary pulley pressure from dropping by switching the speed-change control valve to either one of the neutral position and the pressure build-up position, when the slippage between the drive belt and each of the primary and secondary pulleys has been foretold during the downshift.

19. The method as claimed in claim 18, further comprising:

foretelling that the slippage between the drive belt and each of the primary and secondary pulleys tends to occur, when a condition that the primary pulley pressure is less than a first predetermined pressure level is satisfied or when a combined condition of (i) the condition that the primary pulley pressure is less than the first predetermined pressure level and (ii) at least one of a condition that a primary pulley speed is less than a first predetermined rotational speed and a condition that a vehicle speed is less than a predetermined vehicle-speed threshold value is satisfied.

20. The method as claimed in claim 19, further comprising:

foretelling that there is a less possibility for the slippage between the drive belt and each of the primary and secondary pulleys to occur, when the primary pulley pressure is higher than or equal to a second predetermined pressure level higher than the first predetermined pressure level, or when the primary pulley speed is greater than or equal to a second predetermined rotational speed higher than the first predetermined rotational speed.

21. The method as claimed in claim 19, further comprising:

setting the first predetermined pressure level for the primary pulley pressure to a pressure level lower than a required primary pulley pressure, which is determined based on an actual transmission ratio and a transmission input torque, by a predetermined pressure.

22. The method as claimed in claim 18, further comprising:

foretelling that the slippage between the drive belt and each of the primary and secondary pulleys tends to occur, when a condition that a vehicle's deceleration rate is greater than or equal to a predetermined deceleration rate is satisfied or when a combined condition of (i) the condition that a vehicle's deceleration rate is greater than or equal to a predetermined deceleration rate and (ii) at least one of a condition that a primary pulley speed is less than a predetermined rotational speed and a third condition that a vehicle speed is less than a predetermined vehicle-speed threshold value is satisfied.

23. The method as claimed in claim 18, further comprising:

setting an actual transmission ratio, which is calculated before a set time period from a time when the slippage between the drive belt and each of the primary and secondary pulleys has been foretold, to a desired transmission ratio; and outputting a command signal corresponding to the desired transmission ratio to a ratio-change control actuator.

24. The method as claimed in claim 23, further comprising:

returning the ratio-change control actuator to an operative position obtained before the set time period from the time when the slippage between the drive belt and each of the primary and secondary pulleys has been foretold.

25. The method as claimed in claim 18, further comprising:

holding a ratio-change operating state obtained when the slippage between the drive belt and each of the primary and secondary pulleys has been foretold.

26. The method as claimed in claim 18, further comprising:

setting a transmission ratio of a relatively higher speed side as compared with a ratio-change operating state obtained when the slippage between the drive belt and each of the primary and secondary pulleys has been foretold, to a desired transmission ratio; and outputting a command signal corresponding to the desired transmission ratio set to the transmission ratio of the relatively higher speed side to a ratio-change control actuator.

27. The method as claimed in claim 26, further comprising:

setting a predetermined maximum pulley ratio to the desired transmission ratio; and outputting a command signal corresponding to the desired transmission ratio set to the predetermined maximum pulley ratio to the ratio-change control actuator.

28. The method as claimed in claim 18, further comprising:

further executing, with the speed-change control valve kept in the pressure build-up position, pressure-rise control for rising a line pressure, which is used as an initial pressure for the primary pulley pressure, to a higher pressure value as compared with a line pressure level produced when the slippage between the drive belt and each of the primary and secondary pulleys has been foretold.

* * * * *